Dec. 10, 1935.   H. KÜPPENBENDER ET AL   2,023,838
COMBINED DISTANCE METER AND VIEW FINDER
Original Filed Jan. 20, 1934
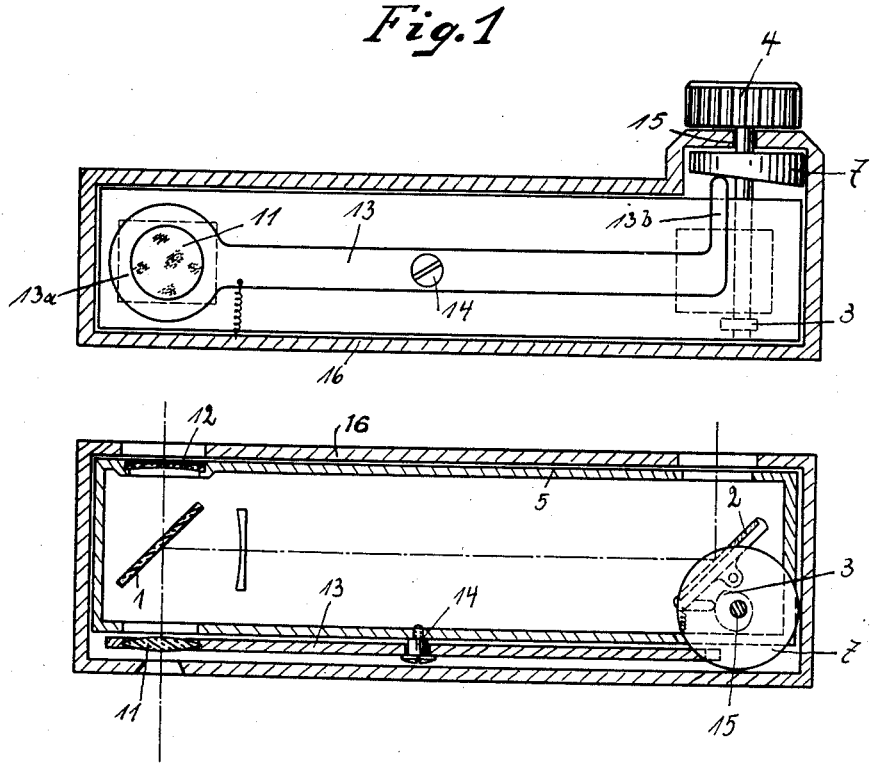

Dec. 10, 1935.   N. D. LEVIN   2,023,846

MOTOR SUSPENSION

Original Filed March 28, 1929   2 Sheets-Sheet 1

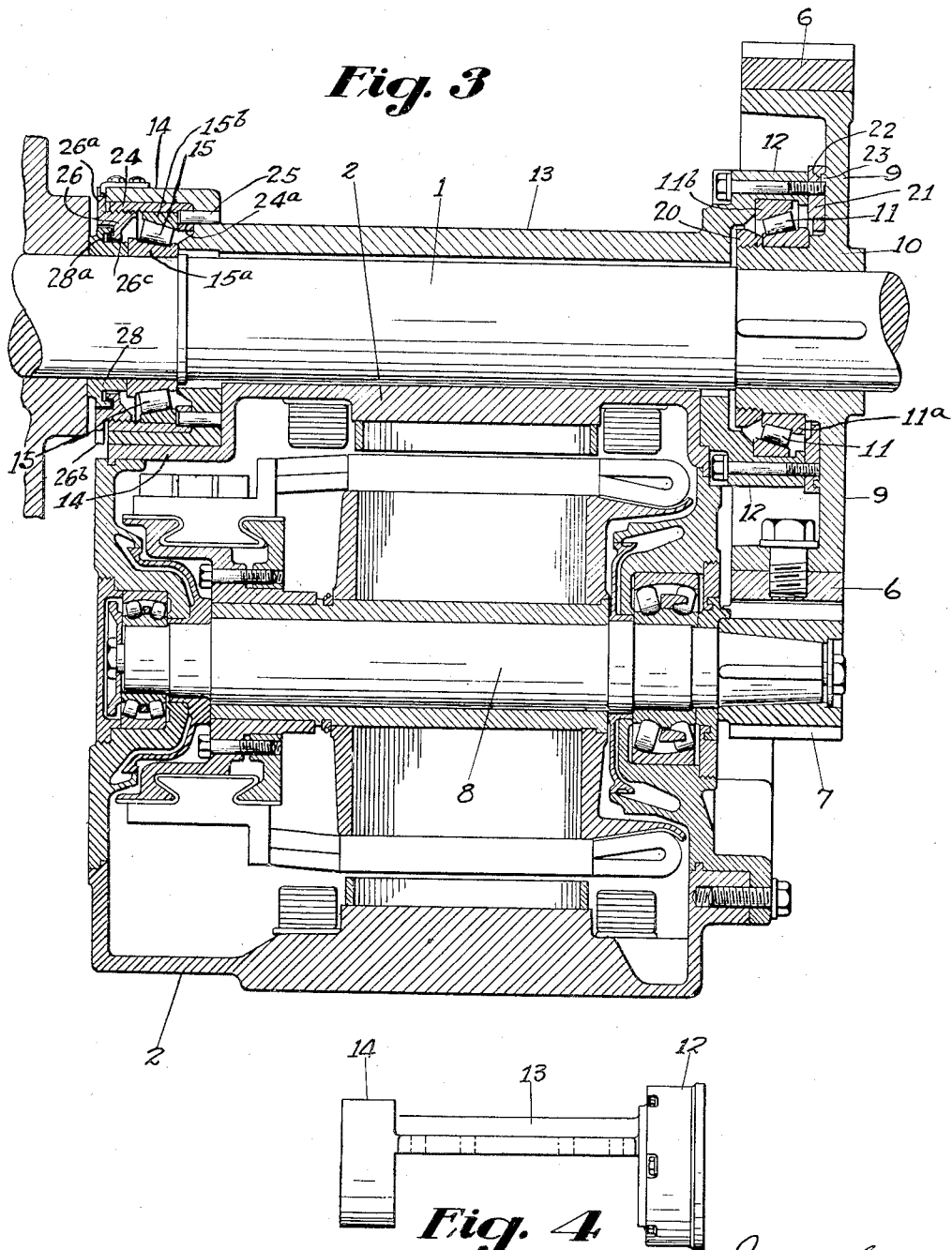

Patented Dec. 10, 1935

2,023,846

UNITED STATES PATENT OFFICE 2,023,846

MOTOR SUSPENSION

Nils D. Levin, Columbus, Ohio, assignor to The Jeffrey Manufacturing Company, Columbus, Ohio, a corporation of Ohio Application March 28, 1929, Serial No. 350,635
Renewed January 9, 1932

31 Claims. (Cl. 105—137)

The present invention relates to certain new and useful improvements in motor suspensions of the type applicable to the support of the actuating motor upon the axle of an electric locomotive.

It is the especial object of this invention to provide improved means for the suspension of the motors in an electric locomotive whereby relatively large motors may be applied to locomotives of relatively small dimensions and narrow track gauge.

A further object is to provide a motor suspension affording improved convenience for the removal of either the motor or the axle from the locomotive.

The means whereby I attain these and other objects are fully set forth in the following specification and illustrated in the accompanying drawings of which Fig. 1 is a plan view of a motor and axle of an electric locomotive equipped with the devices of my invention.

Fig. 3 is a sectional view, on an enlarged scale, taken along the line III—III of Fig. 2.

Fig. 4 is a detail of the suspension bearing housing for the roller bearings by which the motor is supported upon the axle.

Like numerals refer to similar parts in the several figures.

Figure 1:
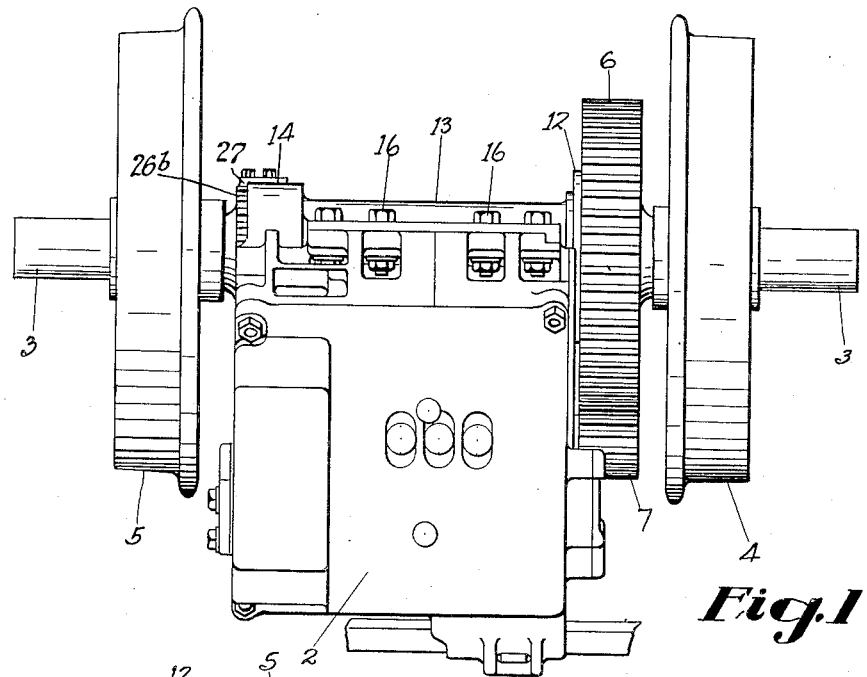

In the recovery of coal, or other materials, from their native beds, tunnels or entries are driven into the seam from which open the chambers wherein the principal mining operations are conducted. Railway tracks are laid in these entries along which travel the cars whereby the materials mined are transported from the mine. Electric locomotives are commonly used to propel these cars along the mine tracks, and because of the low roofs, narrow passages and sharp curves commonly occurring in such installations, there has been developed a peculiarly compact type of locomotive of short wheel base and small external dimensions combined with great strength, durability and power. In such a locomotive the actuating motor is commonly positioned between the driving track wheels and is supported at one side by the frame work of the locomotive and at the other side by journal bearings engaging the axle to which the armature of the motor is connected by a single pair of speed reducing gears. There is an ever insistent demand for locomotives of greater power, and to meet this demand motors of extremely compact design, having relatively small external dimensions, particularly longitudinally of the armature, have been produced.

In the drawings I have shown one of the axles and its associated motor of an electric locomotive of the class described constructed in accordance with my present invention. As here shown the numeral 1 refers to the axle and the numeral 2 refers to the motor by which that axle is actuated. Formed at the ends of the axle 1 are journals 3 adapted to engage the journal boxes by which the frame of the locomotive is supported upon the axle in the usual and well understood manner. Fixed to the axle 1 immediately inside the journals 3 are track wheels 4 and 5 of the common and well known type adapted to rest upon and travel along the rails of a suitable trackway. Adjacent one of the wheels, as for example the wheel 4, is positioned a spur gear 6 which is engaged by the pinion 7 fixed to the armature 8 of the motor 2. The gear 6 is formed with a supporting web 9 positioned at the edge nearest the wheel 4, and this web is formed integral with the hub 10 which is keyed to the axle 1. Upon the periphery of the hub 10 is mounted a journal bearing 11 the outer surface of which is supported in a cylindrical cup 12 formed at the end of the suspension bearing housing 13 concentric with the axle 1. For purposes of illustration I have here shown the bearing 11 as a roller bearing of well known construction, but it is to be understood that any other type of anti-friction bearing may be substituted for that here illustrated without departure from the spirit of my invention. The proportions of these parts are such that the bearing 11 lies wholly within the transverse bounding plane of the gear 6.

At the end of the bearing housing 13 remote from the cup 12 is formed a second cylindrical cup 14 wherein is fitted the outer race of a roller bearing 15, the inner race of which is fixed to the axle 1. The suspension housing 13 is secured to the frame of the motor 2 by suitable attachment bolts 16 and serves to removably support the frame of the motor 2 upon the axle 1. The proportions of these parts are such that the suspension bearings 11 and 15 lie wholly within the transverse bounding planes of the motor 2 and the gear 6.

Figure 2:
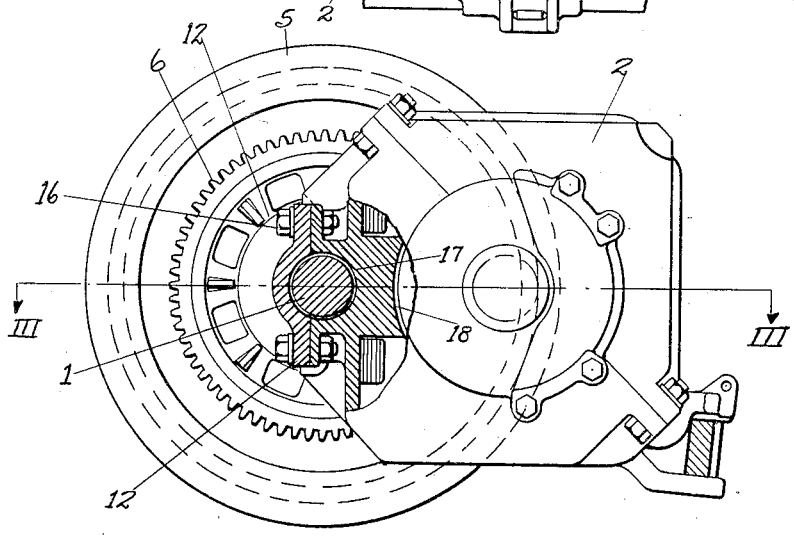
Fig. 2 is a side elevation of the devices illustrated in Fig. 1, certain parts being broken away to reveal other parts.

The necessity for maintaining running clearances between the operative parts of the locomotive and the top of the track rail places a limit upon the diameter of the gear 6 which must necessarily be materially less than the diameter of the track wheel 4. Since the power of the motor is directly proportional to the speed of its armature, relatively high armature speed is desirable. Maintenance of the desired relatively low rate of travel of the locomotive with relatively high armature speed entails the greatest possible gear ratio between the motor 2 and the axle 1. To reduce the distance between the centers of the armature 8 and the axle 1, so that the gear 6 may mesh with the relatively small pinion 7, I have provided, as shown at 17 in Fig. 2 of the drawings, a longitudinally extending groove in the field frame of the motor 2 into which the axle 1 projects laterally. By positioning this groove 17 in the central radial plane of the magnetic pole 18 of the motor, interference with the flow of the magnetic flux in the field frame is avoided.

According to a further aspect of the invention, means are provided for the adjustment of bearings 11 and 15 to compensate the wear therein. The inner race 11a of bearing 11 is fixed on the hub of gear 9 and retained in position by means of a ring nut 20. The outer race 11b is fixed in cup 12. It will be noted that the races have opposed conical faces so that bearing 11 also functions as thrust bearing.

Fixed to the end of cup 12 is a closure ring 21 provided with an annular groove 22 engaged by a rib 23 formed on the inner surface of the web of gear 9. The closure ring serves to prevent the escape of lubricant from the bearing.

The inner race 15a of bearing 15 is fixed on axle 1 while the outer race 15b is fixed in a sleeve 24 which is longitudinally movable relative to axle 1 within housing 14 but is restrained against relative rotation by means of pins 25 fixed in the housing and projecting loosely into apertures formed in a radial flange 24a of sleeve 24.

The outer end of sleeve 24 is provided with internal threads which are engaged by a ring nut 26 having a radial flange 26a overlying the end of cup or housing 14. Flange 26a is provided with peripheral teeth 26b adapted to be engaged by a locking member 27 removably fixed on housing 14.

If play has developed in the bearings, the motor housing is first pushed to the right (Fig. 3) on axle 1 to take up the wear in bearing 11, thus bringing ring 21 into closer relation with the web of gear 9 or in substantial contact therewith as shown in Fig. 3. The locking element 27 is disengaged from teeth 26b and nut 26 is rotated to move sleeve 24 to the left thereby taking up the play in bearing 15. When the parts have been suitably adjusted, locking element 27 is again engaged wtih teeth 26b to retain the latter in adjusted position. In order to retain the lubricant in bearing 15, nut 26 is provided with an inner annular rib 26c which engages in a groove 28a formed in a collar 28 mounted on the axle.

By the arrangement of parts above described, the size and power of the motor applicable to wheels and axles of given size and gauge may be materially increased, the axles and wheels may be removed from the locomotive without disturbing the electrical connections of the motor, or the motor may be removed from the locomotive while it is supported upon the axle and wheels.

What I claim is:

1. In a machine of the class described, the combination wtih a motor having a magnetic frame and an armature extending longitudinally thereof, an axle extending parallel with said armature and connected thereto by intermeshing gears, an anti-friction journal bearing mounted upon the hub of one of said gears, and means upon said motor frame engaging said bearing to support said motor as and for the purpose set forth.

2. In a machine of the class described, the combination with a motor having a magnetic frame and an armature extending longitudinally thereof, an axle extending parallel with said armature, a gear fixed to said axle and engaging a pinion attached to said armature, an anti-friction journal bearing mounted upon the hub of and within the bounding planes of said gear, and means upon the motor frame engaging said bearing to support said motor as and for the purpose set forth.

3. In a machine of the class described, the combination with a motor having a magnetic frame and an armature extending longitudinally thereof, an axle extending parallel with said armature, a gear fixed to said axle and engaging a pinion attached to said armature, an anti-friction journal bearing mounted upon the hub of said gear, and means removably attached to said motor frame and engaging said bearing to support said motor as and for the purpose set forth.

4. In a machine of the class described, a wheel supported axle, a motor having an armature shaft extending parallel to said axle, and mounting means for said motor including a member extending along the axle, said member having terminal cylindrical bearing housings surrounding the axle and a central web portion to which one side of the motor is secured.

5. In a machine of the class described, a wheel supported axle, a motor having an armature shaft extending parallel to said axle, mounting means for said motor including a member extending along the axle, said member having terminal cylindrical bearing housings surrounding the axle and a central web portion extending partially around the axle circumference between the bearing housings, and means securing the motor to said web portion, the motor casing providing an axle housing portion complemental to said web portion.

6. In a machine of the class described, an axle having wheels mounted at its extremities, a gear immediately inwardly of one of the wheels and having an inwardly extending hub, a motor having a frame substantially filling the space between the other wheel and the inner face of said gear, driving means between said motor and said gear, and suspension means for said motor including a member mounted on the axle and having bearing support at one end on the hub of said gear and at the other end on the axle adjacent the wheel opposite the gear.

7. In a machine of the class described, an axle having wheels mounted at its extremities, a gear immediately inwardly of one of the wheels and having an inwardly projecting hub, a motor having a frame substantially filling the space between the other wheel and the inner face of said gear, driving means between said motor and said gear, and suspension means for said motor including a member mounted on the axle and having housing means at its extremities for anti-friction bearings, one of said bearings being mounted on the gear hub and the other on the axle adjacent the wheel opposite the gear.

8. A motor drive for a railway axle including a motor, means to drive the axle from the motor, a housing mounted on the axle and forming a support for the motor, an anti-friction bearing between the axle and housing having an inner race fixed to the axle and an outer race carried by the housing, and means operable to move said outer race with respect to the housing to adjust the relative position of the inner and outer races.

9. A motor drive for a railway axle including a motor, means to drive the axle from the motor, a housing comprising an enclosure for the axle and forming a support for the motor, an anti-friction bearing between said housing and the axle and including an inner race fixed to the axle and an outer race carried by the housing, and means to adjust said inner and outer races with respect to each other.

10. A motor drive for a railway axle including a motor, means to drive the axle from the motor, a housing enclosing the axle and forming a support for the motor, anti-friction bearings at each end of said housing having their inner races fixed to the axle, the outer races of said bearings being carried by the housing, and means to move said housing longitudinally with respect to the axle to adjust the position of the outer races with respect to the inner races.

11. A motor drive for a railway axle including a motor, means to drive the axle from the motor, a housing enclosing the axle and forming a support for the motor, anti-friction bearings at each end of said housing having their inner races fixed to the axle, the outer races of said bearings being carried by the housing, and means to move said outer races relatively to each other to adjust the position of the outer races with respect to the inner races.

12. A motor drive for a railway axle including a motor, means to drive the axle from the motor, a housing mounted on the axle and forming a support for the motor, anti-friction bearings between said housing and axle including inner and outer races, a ring nut engaging the outer raceway of one of the bearings to move the same longitudinally of the housing to adjust the setting of both the bearings.

13. A motor drive for a railway axle including a motor, means to drive the axle from the motor, a housing enclosing the axle and forming a support for the motor, an anti-friction bearing between the axle and housing, the inner race of the bearing being fixed to the axle and the outer race being carried by the housing, and means to move the outer race of the bearing and the housing in opposite axial directions to adjust the relative positions of the races of said bearing.

14. In a machine of the class described, the combination with an electric motor having a magnetic frame including pole pieces and an armature extending longitudinally thereof, one of said pole pieces being projected from the motor frame, said projected pole piece and the adjacent frame having a groove extending longitudinally thereof, an axle parallel to said armature and lying partly in said groove, the portion of the axle passing through the pole piece having a large segmental portion thereof embedded in the pole piece groove, and means to support said frame on said axle comprising a cover for said axle magnetically connected to said frame adjacent the projected pole piece.

15. In a motor drive for a railway axle, said axle having wheels mounted at its extremities, a gear fixed immediately inwardly of one of the wheels, a motor having a frame substantially filling the space between the inner face of said gear and the other wheel, means to drive said gear from said motor, suspension means for said motor including a member mounted on the axle between said gear and the opposite wheel, an anti-friction bearing between the axle and said member including an inner race fixed to the axle and an outer race carried by said member, and means operable to move said outer race with respect to said member to adjust the relative position of the inner and outer races.

16. In a motor drive for a railway axle, said axle having wheels mounted at its extremities, a gear fixed immediately inwardly of one of the wheels, a motor, a housing comprising an enclosure for the axle and forming a support for the motor, said housing substantially filling the space between the inner face of said gear and the other wheel, means to drive said gear from said motor, an anti-friction bearing between the axle and said housing including an inner race fixed to the axle and an outer race carried by said housing, and means operable to move said outer race with respect to said housing to adjust the relative position of the inner and outer races.

17. In a motor drive for a railway axle, said axle having wheels mounted at its extremities, a gear fixed immediately inwardly of one of the wheels, a motor, a housing comprising an enclosure for the axle and forming a support for the motor, said housing substantially filling the space between the inner face of said gear and the other wheel, means to drive said gear from said motor, anti-friction bearings at each end of said housing having their inner races fixed to the axle and their outer races carried by the housing, and means to move said housing longitudinally with respect to the axle to adjust the position of the outer races with respect to the inner races.

18. In a motor drive for a railway axle, said axle having wheels mounted at its extremities, a gear fixed immediately inwardly of one of the wheels, a motor, a housing comprising an enclosure for the axle and forming a support for the motor, said housing substantially filling the space between the inner face of said gear and the other wheel, means to drive said gear from said motor, anti-friction bearings at each end of said housing having their inner races fixed to the axle and their outer races carried by said housing, and means to move said outer races relatively to each other to adjust the position of the outer races with respect to the inner races.

19. In a motor drive for a railway axle, said axle having wheels mounted at its extremities, a gear fixed immediately inwardly of one of the wheels, a motor, a housing comprising an enclosure for the axle and forming a support for the motor, said housing substantially filling the space between the inner face of said gear and the other wheel, means to drive said gear from said motor, anti-friction bearings between said housing and axle including inner and outer races, a ring nut engaging the outer raceway of one of the bearings to move the same longitudinally of the housing to adjust the setting of both bearings.

20. In a motor drive for a railway axle, said axle having wheels mounted at its extremities, a gear fixed immediately inwardly of one of the wheels, a motor, means to drive said gear from the motor, a housing comprising an enclosure for the axle and forming a support for the motor, said housing substantially filling the space between the inner face of said gear and the other wheel, an anti-friction bearing between the axle and housing, including inner and outer races, the inner race of the bearing being fixed to the axle